(12) United States Patent
Viezens et al.

(10) Patent No.: US 7,594,366 B2
(45) Date of Patent: Sep. 29, 2009

(54) DEVICE AND METHOD FOR FASTENING FACADE PLATES

(75) Inventors: Ludwig Viezens, Eckenhaider Hauptstr. 84, 90542 Eckental (DE); Erwin Strattner, Ammerndorf (DE); Klaus Dieter Weise, Ammerndorf (DE)

(73) Assignees: Ludwig Viezens, Eckental (DE); Weise + Stratner GmbH, Ammerndorf (DE)

( * ) Notice: Subject to any disclaimer, the term of this patent is extended or adjusted under 35 U.S.C. 154(b) by 696 days.

(21) Appl. No.: 10/537,305

(22) PCT Filed: Dec. 3, 2003

(86) PCT No.: PCT/EP03/13654

§ 371 (c)(1),
(2), (4) Date: Aug. 4, 2005

(87) PCT Pub. No.: WO2004/051027

PCT Pub. Date: Jun. 17, 2004

(65) Prior Publication Data

US 2006/0162273 A1    Jul. 27, 2006

(30) Foreign Application Priority Data

Dec. 3, 2002   (DE) .................................. 102 56 637
Jan. 10, 2003  (DE) .................................. 103 00 854

(51) Int. Cl.
  *E04C 5/12*  (2006.01)
(52) U.S. Cl. .................. 52/223.13; 52/235; 52/513; 52/699; 52/707; 52/745.21
(58) Field of Classification Search ............... 52/223.13, 52/235, 513, 698, 699, 700, 707, 136, 137, 52/745.21; 411/82, 82.1, 82.3; 405/259.3, 405/259.5, 269
See application file for complete search history.

(56) References Cited

U.S. PATENT DOCUMENTS

| | | | | |
|---|---|---|---|---|
| 4,893,974 A | * | 1/1990 | Fischer et al. | 411/82.1 |
| 4,928,451 A | * | 5/1990 | Reigstad et al. | 52/223.13 |
| 4,930,284 A | * | 6/1990 | Falco | 52/704 |
| 5,007,780 A | * | 4/1991 | Hoffmann et al. | 411/82 |
| 7,404,274 B2 | * | 7/2008 | Hayes | 52/513 |

FOREIGN PATENT DOCUMENTS

| | | |
|---|---|---|
| DE | 3004276 C2 | 8/1981 |
| DE | 30 07 434 A1 | 9/1981 |

(Continued)

OTHER PUBLICATIONS

DE-GM 73 23 454.

*Primary Examiner*—Richard E Chilcot, Jr.
*Assistant Examiner*—Bryan Eppes
(74) *Attorney, Agent, or Firm*—Manabu Kanesaka

(57) ABSTRACT

A device for fastening facade plates, includes a threaded bar which extends from a holding element. The holding element is provided with an annular space at the first end thereof, which is located near the threaded bar. The annular space encompasses a wall that is made of an elastic material. A channel extends from the annular space to a second end which is located at a distance from the threaded bar while a valve, by means of which the channel can be sealed, is provided at the second end.

14 Claims, 3 Drawing Sheets

FOREIGN PATENT DOCUMENTS

| | | |
|---|---|---|
| DE | 38 15 551 A | 11/1988 |
| DE | 39 00 671 C | 3/1990 |
| DE | 199 61 555 A1 | 6/2001 |
| EP | 0 014 728 A | 9/1980 |
| EP | 398838 A1 * | 11/1990 |
| EP | 0 635 646 A | 1/1995 |
| EP | 0 863 353 A | 9/1998 |
| GB | 2024978 A * | 1/1980 |
| GB | 2 263 958 A | 8/1993 |

* cited by examiner

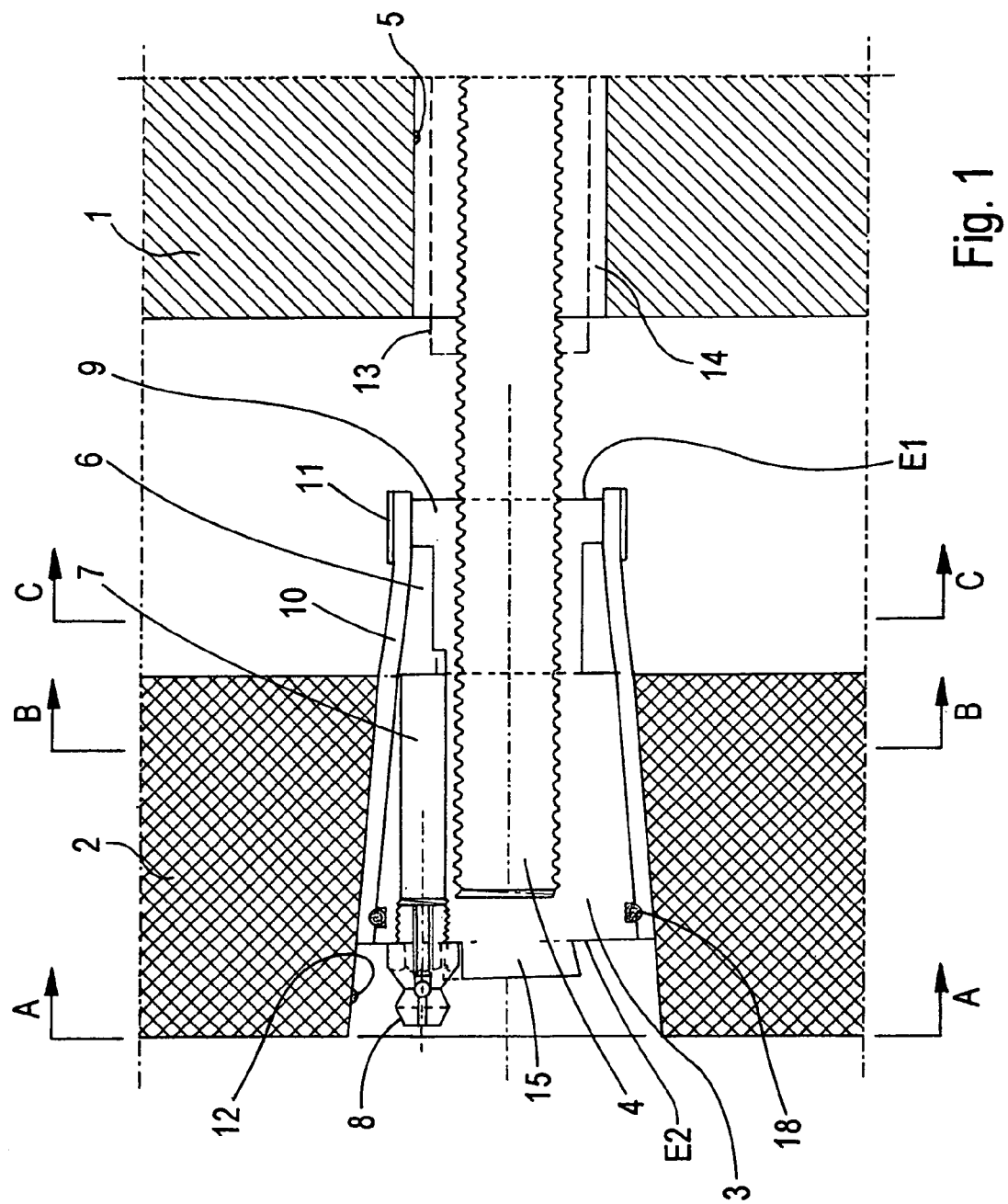
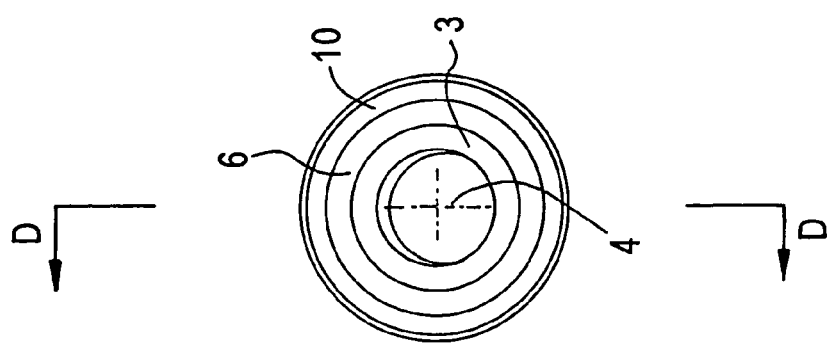

DEVICE AND METHOD FOR FASTENING FACADE PLATES

RELATED APPLICATIONS

The present application is based on International Application No. PCT/EP2003/013654 filed Dec. 3, 2003, and claims priority from, European Application Numbers 102 56 637.2 and 103 00 854.3, filed Dec. 3, 2002 and Jan. 10, 2003, respectively, the disclosures of which are hereby incorporated by reference herein in its entirety.

FIELD OF THE INVENTION

The invention relates to a device and a method of fastening Façade plates.

BACKGROUND OF THE INVENTION

The invention relates in particular to the area of restoration of buildings on which façade plates are installed. Façade plates are usually fastened with metal anchors on a supporting wall of a building. The metal anchors divert a vertical load of the façade plates into the supporting wall. Furthermore, the metal anchors hold the façade plates installed at a distance to the supporting wall in the horizontal direction.

During the course of time, thermally induced tension and aggressive exhaust gases in the air may cause the metal anchors to break out. This may cause the façade plates to become disconnected and to fall from the building. This presents a significant danger to passers-by. Facades with damaged façade anchors must be immediately renovated or restored.

As defined by the state of technology, it is required that the building either be covered with new façade plates or the old façade plates must be removed and the façade redone with new anchors. Both renovation measures are extremely costly and time-consuming.

In addition to this, it is also known that for the securing of loose façade plates must be provided a reach-through hole bored through the façade plate and this must be secured to the supporting wall with a screw. Although this prevents the façade plates from falling off, the façade plates are not held in the horizontal direction. In particular, during a storm, such façade plates become loose and wobble. This may cause the façade plate to break or fall off.

SUMMARY OF THE INVENTION

The object of the invention is to remove the disadvantages of the state of technology. In particular, a device or a method is to be specified with which an enduring renovation of façades is possible with simple and inexpensive means.

This object is solved by the features of claims 1 and 12. Useful embodiments result from the features of claims 2 to 8 and 10 to 13.

The suggested device makes it simple to renovate façades. When façade plates must be re-mounted, they do not need to be removed. They can be re-mounted right where they are. With this, the suggested device ensures both a vertical load diversion and a horizontal fixation of the façade plates.

BRIEF DESCRIPTION OF THE DRAWINGS

An example will now be used to describe the invention in more detail based on the drawing. The figures are listed below:

FIG. 1 a first cross-section view through a device,
FIG. 2 a cross-section view in accordance with intersecting line C-C in FIG. 1,
FIG. 3 a cross-section view in accordance with intersecting line B-B in FIG. 1,
FIG. 4 a cross-section view in accordance with intersecting line A-A in FIG. 1,
FIG. 5 a second cross-section view of the device, wherein a annular space is filled in and
FIG. 6 a cross-section view in accordance with intersecting line C-C in FIG. 5.

DETAILED DESCRIPTION OF THE INVENTION

Figures 3, 4:
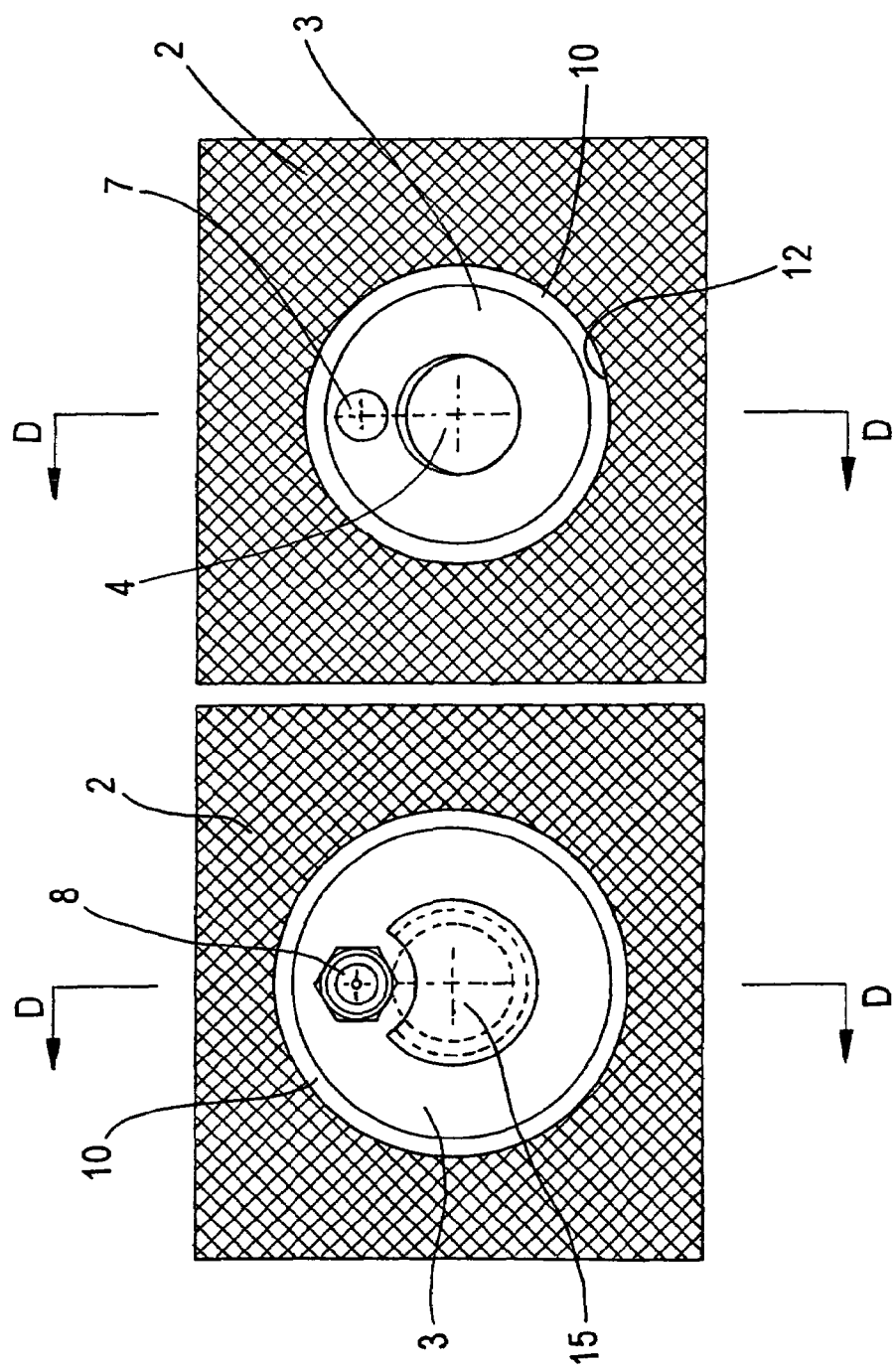

In the figures, 1 designates a supporting wall of a building and 2 designates a façade plate held at a distance. An anchor as provided by the invention to fasten façade plate 2 has a holding element 3 which is usefully made of plastic and from which a threaded bar 4 extends into a hole bored in the supporting wall. A first end E1 of the holding element 3 is located in the vicinity of the threaded bar 4. The second end which is at a distance from the threaded bar 4 is designated E2. A channel 7 extends from an annular space 6 created in the holding element 3 to the second end E2. An opening of the channel 7 provided on the second end E2 is closed with a flap valve 8. A flange 9 is located on the first end E1 of the holding element 3. A silicon tube 10 surrounds the holding element. The silicon tube 10 is fastened with a tube binder 11 on the flange 9. The outer circumference of the holding element 3 is tapered conically in the direction of the threaded bar 4. It rests by the silicone tube 10 positively on one of the reach-through bored holes 12 which reaches through the façade plate 2. An O-ring which is designated as 18 is provided in the vicinity of the second end E2 of the holding element 3 between the holding element 3 and the silicone tube 10.

The threaded bar 4 engages in a mesh sleeve which is fixated in the bored hole 5 with composite mortar 14.

The cross-section view shown in FIG. 2 illustrates clearly again the formation of the annular space 6 surrounded by the silicone tube 10. The cross-section view in FIG. 3 shows the conical section of the holding element 3 which rests by the silicon tube 10 positively on the wall of the also conically formed reach-through bored hole 12. FIG. 4 shows a cross-section view or a view of the top of the second end E2 of the anchor located in the reach-through bored hole 12. An undercut structure 15 provided on the second end E2 is made in one-piece with the holding element 3.

Figure 5:
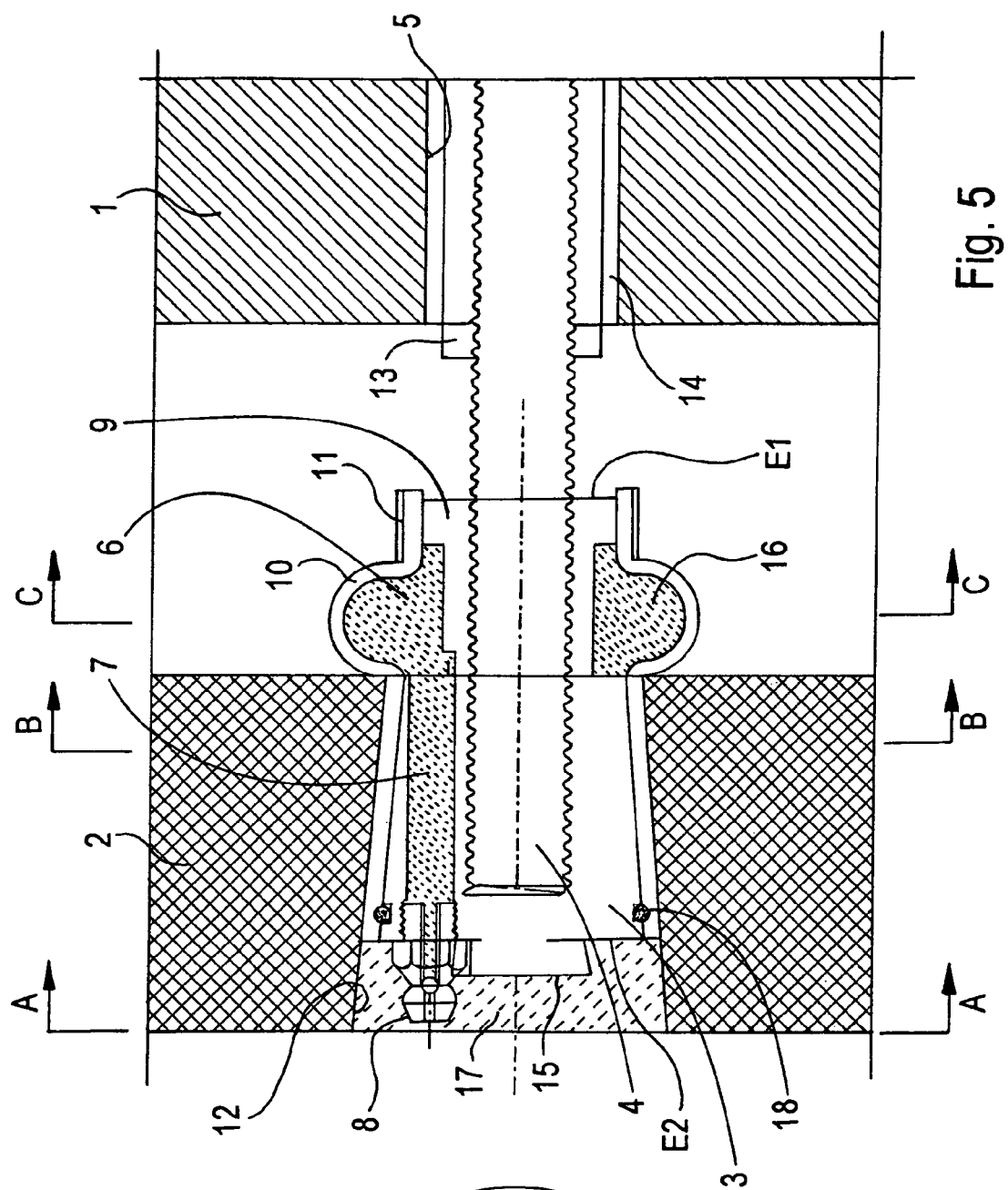

FIG. 5 shows the anchor in accordance with FIG. 1, wherein here the channel 7 and the annular space 6 are filled with a viscoplastic hardenable resin 16. Due to the elasticity of the silicon tube 10 and an injection of the viscoplastic hardenable mass, for example two-component epoxy resin, a bulge forms in the area of the annular space 6, which bulge keeps the holding element 3 from shifting in the horizontal direction. The O-ring 18 reliably prevents an undesired escape of the two-component epoxy resin between the holding element 3 and the silicon tube 10.

Figure 6:
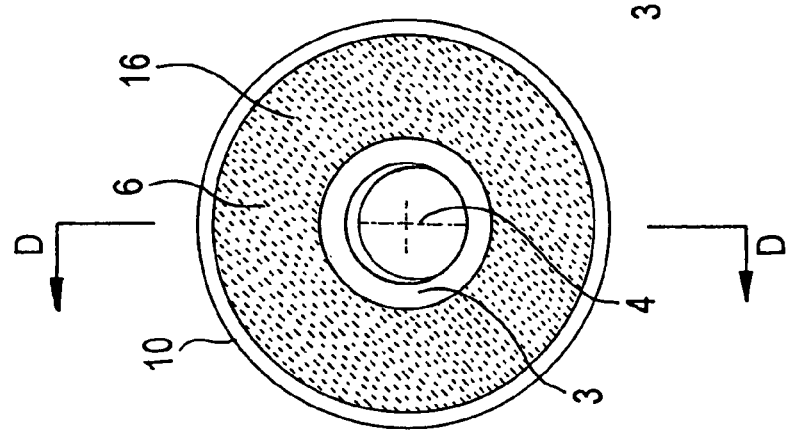

FIG. 6 shows a cross-section view in accordance with intersecting line C-C. Here again the annular space 6 filled with the viscoplastic mass 16 is clearly shown.

To anchor the façade plate 2, it has been shown to be useful that the following working method be performed:

First, a through bored hole is made through the façade plate 2 with a drill and with the same drill the bored hole 5 is made immediately afterwards. Then the through bored hole is conically widened so that the cone tapers towards the supporting wall 1. Then composite mortar 14 or synthetic resin is injected into the bored hole 5 and a mesh sleeve 13 or a lattice dowel is inserted. Then the anchor with the threaded bar 4 is inserted into the mesh sleeve 13 until the holding element 3 or the silicon tube 10 surrounding the holding element rests flat positively on the conic, through bored hole 12. After the composite mortar 14 has hardened, the holding element 3 is turned clockwise to create a weak twisting of the holding element 3 with the façade plate 2. Naturally such a twisting can only be created when the façade plate 2 is still held at a distance with the old anchors (not shown here) against the supporting wall 1. Twisting of the holding element 3 by turning it clockwise can also be omitted if the O-ring 18 is provided.

After the holding element 3 has been twisted with the façade plate 2, a specified amount of two-component epoxy resin is pressed into the annular space 6 with the flap valve 8. This causes the elastic wall formed from the silicon tube 10 surrounding the annular space to bulge out. When the O-ring 18 is provided, a reliable sealing effect is always achieved even with a slightly tilted utilisation of the holding element 3 in the through bored hole 12. An escape of the two-component epoxy resin into the area of the second end E2 is reliably avoided. After hardening of the viscoplastic hardenable mass 16, the holding element 3 is positioned essentially unshiftably in the through bored hole 12. It is held elastically in the through bored hole 12 by the elastic properties of the silicon tube 10. The suggested anchor holds the façade plate 2 in horizontal direction. At the same time, a vertical load diversion via the supporting wall 1 is also achieved.

Finally, a remaining opening of the through bored hole 12 is filled, for example, with a filler mass 17 containing a binding agent. The binding agent can be cement or a synthetic material. The undercut structure 15 is used for a close bond of the holding element 3 with the filler mass 17. Due to the undercut structure 15, the hardened filler mass 17 cannot detach itself from the holding element 3.

In an embodiment, it can also be that an axial recess or a blind hole is provided on the second end E2. Such a blind hole is used to fasten a cover to cover the opening formed by the through bored hole 12. Such a cover which can be made of refined steel, for instance, is preferably used for façade plates 2 which are made of glass.

The suggested anchor is particularly advantageous because this can also be used to compensate for thermally-created recesses of the façade plates 2. The compensation is achieved by the elastic properties of the silicon tube 10 surrounding the holding element 3. Undesired bending of the façade plates 2 can thus be reliably avoided.

REFERENCE LISTING

1 Supporting wall
2 Façade plate
3 Holding element
4 Threaded bar
5 Bored hole
6 Annular space
7 Channel
8 Flap valve
9 Flange
10 Silicon tube
11 Tube binder
12 Through bored hole
13 Mesh sleeve
14 Composite mortar
15 Undercut structure
16 Viscoplastic hardenable mass
17 Filler mass
18 O-ring
E1 First end
E2 Second end

The invention claimed is:

1. A façade anchoring device, comprising:
   a holding element having a threaded bar extending from a first end thereof, and
   an elastic tube surrounding the holding element and extending from the first end to a second end,
   wherein the holding elements tapers conically from the second end to the first end,
   wherein, on its first end, an annular space is formed between the holding element and the elastic tube,
   wherein a channel extends from the annular space to the second end at a distance from the first end, and
   wherein a valve is disposed on the second end to close the channel.

2. Device as defined in claim 1, wherein the holding element has a larger diameter on the second end than on the first end.

3. Device as defined in claim 1, wherein the holding element tapers conically from the second end to the first end.

4. Device as defined in claim 1, wherein the holding element is one-piece and made of plastic.

5. Device as defined in claim 1, wherein the elastic tube extends essentially over the entire axial length of the holding element.

6. Device as defined in claim 1, wherein the elastic tube is fastened on a flange located on the first end of the holding element via a mounting element.

7. Device as defined in claim 1, wherein an undercut projection is provided on the second end.

8. Device as defined in claim 1, wherein a centrical recess is provided on the second end.

9. A method of fastening façade plates according to the device of claim 1, comprising:
   a) making a bored hole extending into a supporting wall and reaching through the façade plate.
   b) widening the radius of the reach-through bored hole reaching through the façade plate in the vicinity of a visible side of the façade plate,
   c) installing a dowel in the bored hole made in the supporting wall using a hardenable mass,
   d) inserting the threaded bar into the dowel so that the holding element lies on the inner circumference of the reach-through bored hole,
   e) screwing in the device and mount to the façade plate,
   f) injecting a viscoplastic hardenable mass via the valve so that the wall surrounding the annular space is widened and the holding element is thereby held in the reach-through bored hole.

10. Method as defined in claim 9, wherein the radius of the reach-through bored hole is conically widened.

11. Method as defined in claim 9, wherein an epoxy resin is used as the viscoplastic hardenable mass.

12. Method as defined in claim 9, wherein an opening of the reach-through bored hole remaining on the visible side of the facade plate is closed after the hardening of the viscoplastic hardenable mass.

13. Method as defined in claim 12, wherein the opening is closed with a cover or a mass containing a binding agent.

14. The device according to claim 1, wherein the annular space is delimited by an inner wall and an outer wall.

* * * * *